G. A. STAUB.
BAND CUTTER AND FEEDER ATTACHMENT FOR THRESHING MACHINES.
APPLICATION FILED DEC. 17, 1910.

1,057,182.

Patented Mar. 25, 1913.

Inventor
George A. Staub

G. A. STAUB.
BAND CUTTER AND FEEDER ATTACHMENT FOR THRESHING MACHINES.
APPLICATION FILED DEC. 17, 1910.

1,057,182.

Patented Mar. 25, 1913.

Inventor
George A. Staub

UNITED STATES PATENT OFFICE.

GEORGE A. STAUB, OF BEALLSVILLE, MARYLAND.

BAND-CUTTER AND FEEDER ATTACHMENT FOR THRESHING-MACHINES.

1,057,182.   Specification of Letters Patent.   Patented Mar. 25, 1913.

Application filed December 17, 1910. Serial No. 597,887.

*To all whom it may concern:*

Be it known that I, GEORGE A. STAUB, a citizen of the United States, residing at Beallsville, in the county of Montgomery and State of Maryland, have invented new and useful Improvements in Band-Cutter and Feeder Attachments for Threshing-Machines, of which the following is a specification.

My invention relates to improvements in threshing machines, and has particular reference to automatic self-feeding mechanism for such machines.

The particular objects of the invention are to provide a mechanism in which the feed of the grain to the threshing cylinder shall be automatically controlled by the conditions existing at the entrance end and within the operative threshing field, said mechanism operating to automatically control the delivery of grain to the threshing cylinder without interrupting the speed of rotation of said cylinder. The aforesaid mechanism is controlled by means of a speed regulating device through a feeler or detector positioned in the path of the grain and arranged to produce variations in the speed of the grain carrier within prescribed limits; to automatically stop said carrier when conditions demand, holding it immovable during the continuance of abnormal conditions, at the conclusion of which it will again be thrown into operation.

Other and further objects of the invention are to provide a mechanism which is simple and efficient in operation, durable in construction, readily installed, and which can be manufactured at a relatively low cost.

To these and other ends, the nature of which will be readily understood as the invention is hereafter disclosed, my invention consists in the improved construction and combination of parts hereinafter fully described, illustrated in the accompanying drawings and particularly pointed out in the appended claims.

In the drawings, in which similar reference characters indicate similar parts.

In the drawings, 20 designates the threshing cylinder and 21 the concave of a threshing machine, these parts being of any preferred construction, the present invention not pertaining to the construction and arrangement of any of the parts of a threshing machine excepting those in advance of the threshing cylinder, *i. e.*, the band cutter and feeder mechanism, it being understood that the cylinder and concave will be properly supported within the frame of the threshing machine. Those parts of the frame which include the mounting of the cylinder and concave and the succeeding portions of the machine are omitted for the sake of clearness, it being understood that the cylinder 20 is driven at a constant speed from a suitable source and that the shaft of the cylinder is provided with a pulley 22 from which, through drive connections presently described, the necessary power for operation of the parts is provided.

23, 23 designate the sides of the frame on which the controlling mechanism to be described is mounted, the sides being provided with all the necessary bearings required for the mounting of the parts of the controlling mechanism. The particular form of this frame and the manner in which the main portion is supported is immaterial, any preferred form or type of frame being applicable for use.

In the sides 23, at a suitable point in advance of the cylinder, is mounted a band cutter 24 of any preferred type, said band cutter having a shaft 25 projecting from the opposite sides 23 and having at one end a pulley 26 which is operatively connected to the pulley 22 by a belt 27, a suitable belt tightener 28 being provided for retaining a maximum friction drive between the two pulleys. It is to be understood, of course, that this form of drive connection is only an exemplification, as any other preferred type, such for instance as a sprocket and chain drive, may be employed. Mounted on the opposite end of the shaft 25 is a balance wheel or pulley 29, the hub of which is provided with a suitable centrifugal device operative to move a member 30 of a friction drive mechanism mounted on the shaft so as to rotate therewith while adapted to move longitudinally thereof. As shown in the drawings this device is in the form of a pair of arms 31 connected to the hub of the pulley 29 and having their free ends provided with weights 32, said arms being connected to the member 30 by a link 33, the arms 31 being free to move radially under the restraint of springs 34 which serve to control the outward movement of the weighted arms. The friction drive member 30 is of any preferred type of construction, it being understood, however, that its face is preferably formed complemental to that of the member with which it is adapted to coact, which member is preferably hemispherical, as presently described.

It is to be understood that the particular form of centrifugal device described is illustrative only, it being necessary only that the device actually employed is such that the rotation of the shaft 25 will act to spread the arms 31 and by such action provide a frictional drive engagement between the member 30 and its complemental member, this movement in the present instance being longitudinally of the shaft 25 and having the effect of carrying the member 30 in the direction of its axis and into and out of engagement with its complemental member.

35, 35 designate brackets secured to the proper side 23, within which is mounted a shaft 36 preferably extending parallel to and outside of the side 23. Loosely mounted on said shaft 36 is a support 37 preferably formed to provide a bearing for a stub shaft 38 to the outer end of which is secured the hemispherical member 39 hereinbefore referred to as the complemental member, said shaft 36 acting as a pivot point on which the support 37 may be rocked and thereby move the member 39 to relatively position the point of contact of members 30 and 39 toward and from the axis of the member 39 represented by the shaft 38. The member 39 is geared to the shaft 36 by suitable gearing, such as beveled gears 40 and 41, the former being carried by the stub shaft 38 or by the member 39, while the latter (gear 41) is carried by the shaft 36, said gears 40 and 41 remaining in permanent mesh regardless of the position of the member 39 relative to the member 30.

Figures 4, 5, 6:
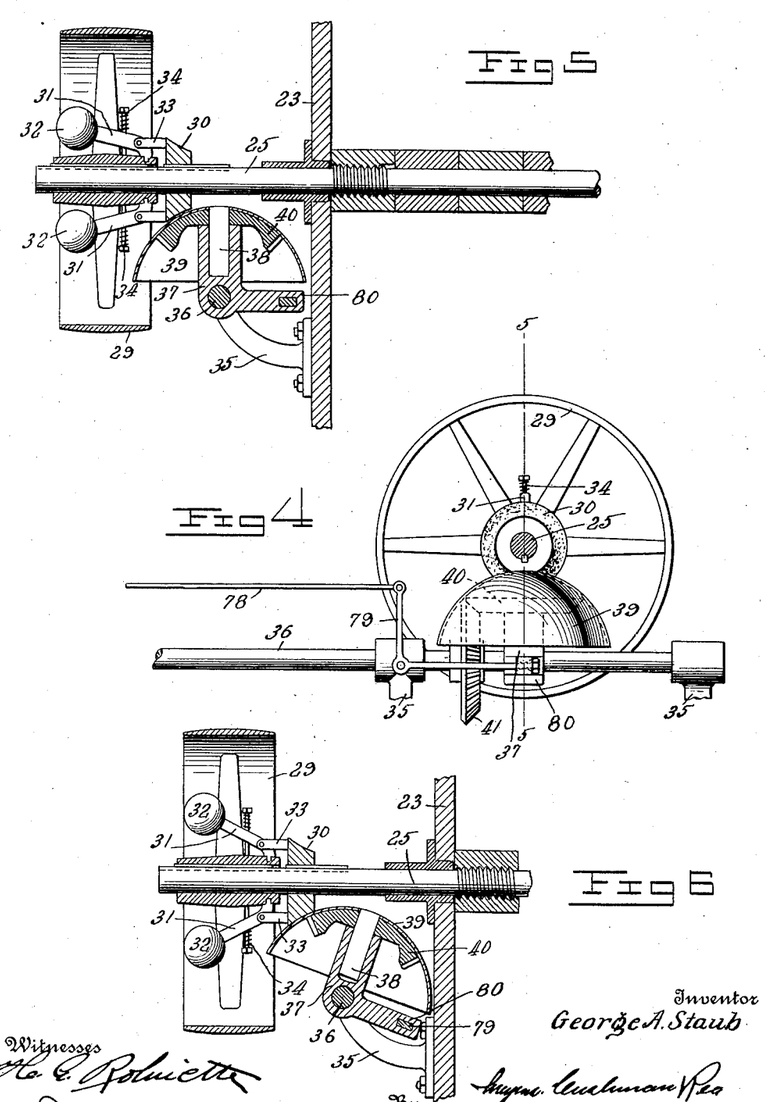
Fig. 4 is a view in elevation of the speed changing mechanism which controls the movement of the feed control mechanism.
Fig. 5 is a section taken on the line 5—5 of Fig. 4.
Fig. 6 is a view similar to Fig. 5 with the parts in a different position.

From the construction above pointed out, it will be readily seen that the threshing cylinder rotates at constant speed, and through the belt connection 27 provides a constant speed to the shaft 25 which causes the member 30 to also rotate at such constant speed. When the parts are at rest, the balls 32 will be in such position as to retain the member 30 out of contact with the member 39. When the cylinder is started the positive drive connections between it and the wheel 29 will cause the latter to rotate, and, with the increase of speed will gradually cause the balls 32 to be swung outward with the result that the member 30 is brought into engagement with the member 39 to drive the latter. Inasmuch as the movement of the balls and the resultant movement of the member 30 will be obtained only after the shaft 25 has reached a predetermined speed of rotation (due to the tension of the springs 34) the cylinder will have reached a proper speed before any movement, whatever, of the member 39 or shaft 36 will occur. And, as will be obvious, the relative speeds of the shafts 25 and 36 will be determined by the point of contact of the members 30 and 39. Figs. 5 and 6 disclose the variations in position of these two members, the position shown in Fig. 5 providing a greater speed to the shaft 36 than when the parts are in the position disclosed in Fig. 6, it being assumed that the speed of shaft 25 is the same in both cases.

It is to be understood that if desired, the tension of the springs 34 may be varied in order to vary the speed at which the cylinder revolves at the time when the contact of the member 30 and 39 is had to bring the feeding mechanism, presently described, into operation. Such tension variation may be provided in any suitable manner as by the use of suitable adjusting screws or nuts.

The shaft 36 extends forwardly and through the medium of a worm 42 and worm wheel 43, the latter being mounted on a shaft 44 mounted in the sides 23, drives a sprocket wheel 45 which in turn is connected, through a sprocket chain 46, to a sprocket wheel 47 loosely mounted on a shaft 48 mounted in the sides 23. This provides a direct drive connection from the member 39 to the sprocket wheel 47 whenever the members 30 and 39 are in contact.

This direct drive connection has for its object the driving of a feed carrier of suitable type, an example of which is shown at 49, said carrier being adapted to pass over and be driven by the shaft 48, suitable operative connections between the shaft and carrier being provided for this purpose.

To provide a connection between the sprocket wheel 47 and the shaft 48, I preferably employ the following mechanism:— 50 designates a dish-shaped wheel loosely mounted on the shaft 48 and which may be adjacent and secured to the wheel 47 or form a part thereof, said wheel 50 being provided with internal recesses 51, each recess having a configuration complemental to a member 52 mounted on an arm 53 pivotally connected to a collar 54 secured to the shaft 48, said collar having means, such as an abutment 55, against which a spring 56 abuts, said spring having a contact with the arm 53, the purpose of the spring being to normally retain the member 52 within any one of the recesses 51. By this construction it will be readily understood that the drive movements of the wheel 47 will be communicated to the shaft 48 through the arm 53 with its permanent engagement with the collar 54 and engagement of the member 52 with a recess. This latter engagement is not intended as a permanent one, the particular structure shown being adapted, as presently described, to provide an automatic disengagement of the member 52 from its recess and thereby permit the wheels 47 and 50 to continue moving disengaged from the shaft 48, the latter being stopped.

Obviously the wheels 47 and 50 may be formed separate and distinct or may be formed as a single wheel, in the former case the two wheels being connected together to move in unison.

The grain carrier 49, as heretofore stated, is of any preferred type, that shown in the drawings including a chain drive, the chain passing over sprocket wheels mounted on the shafts 44 and 48 and over idler sprockets 57 mounted at suitable points, one of which is in the extreme advance of the carrier, the shaft (58) of this latter sprocket being positionable by a suitable chain tightener, an example of which is shown at 59.

Figure 3:
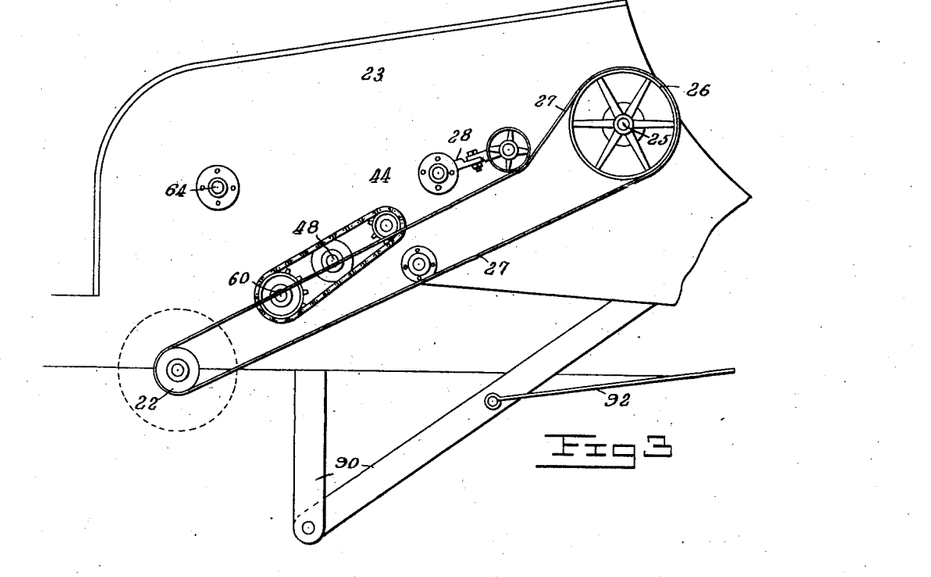
Fig. 3 is a view in elevation of the side opposite that shown in Fig. 1, the said view corresponding to that portion of the disclosure in Fig. 1 shown in Fig. 2.

On a shaft 60 positioned in rear of the shaft 48 and driven from the shaft 44 by a sprocket and chain drive, as indicated in Fig. 3, is a retarding device 100 which acts to prevent a free movement of the grain to the throat of the threshing field.

As will be readily understood, the feed of the grain cannot be uniform owing to the various conditions, such as the condition of the grain itself whether wet, matted, tightly compact, heavy, or scrawny, which present difficulties against such uniform feed and which tend to a more or less choking-up of the threshing field in operation. To provide for correcting these conditions so as to eliminate, as far as possible the choking-up of the threshing field, I provide a special form of mechanism which normally acts to control the speed of the grain carrier to effect the desired result, this change in the speed of the carrier being provided by the rocking of the member 39. If, however, abnormal conditions arise, such as an absolute choking within the throat of the threshing field, the movement of the grain carrier is automatically stopped by breaking the operative connection between the wheel 50 and collar 54, permitting the drive connections from the cylinder to the wheel 50 to continue operating while the shaft 48 and the grain carrier will be held stationary until the abnormal condition has been relieved by the movement of the threshing cylinder. This mechanism will now be described.

62 designates a detector mechanism which comprises a rotatable member driven by the shaft 36 and which is provided with movable fingers adapted to control the movements of a lever primarily adapted to position the member 39. This rotatable member, best illustrated in Figs. 7, 8, and 9, is in the form of a cylinder 63 having its ends provided with stub shafts 64 or their equivalents, said shafts being mounted in bearings in the sides 23, one of said shafts 64 being provided with a worm wheel 65 in mesh with a worm 66 carried by the shaft 36, this arrangement providing the drive for the detector.

Figures 2, 9:
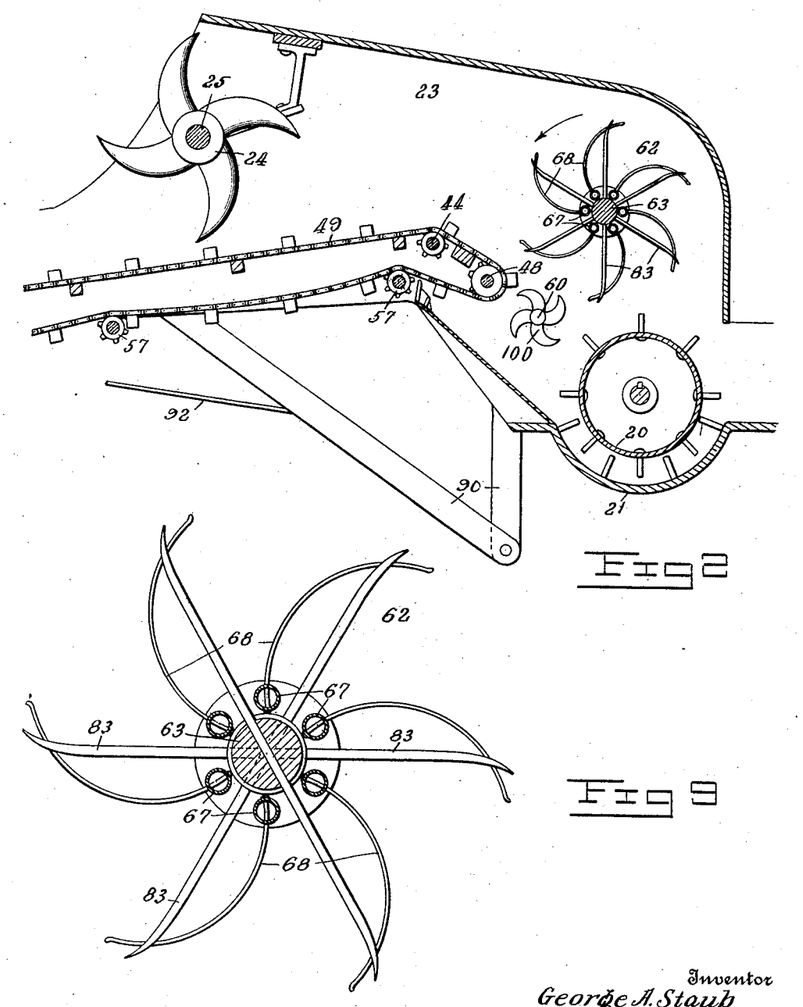
Fig. 2 is a vertical longitudinal section of so much of the threshing machine shown in Fig. 1 as is necessary to indicate the particular location of the elements comprised in the controlling mechanism for the grain feed, the parts being shown on an enlarged scale.
Fig. 9 is a cross section of the detector.
Figure 7:
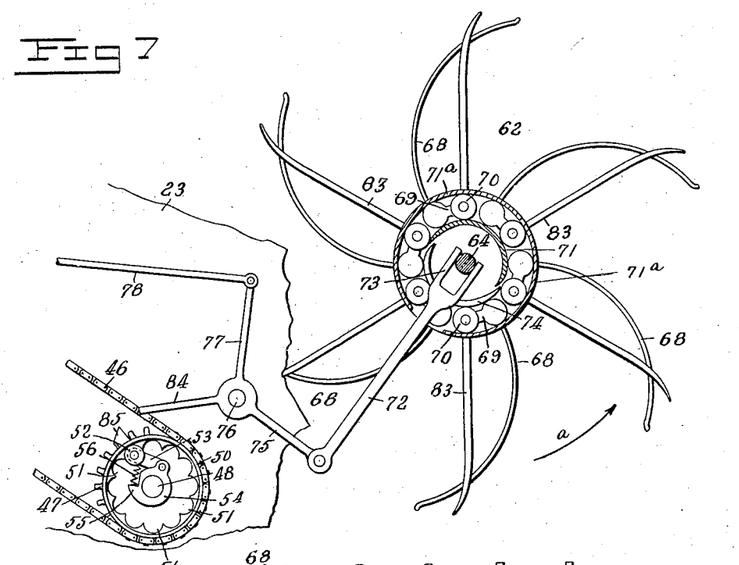
Fig. 7 is a view in end elevation and in partial section of the detector mechanism and including the connections by means of which stoppage of the feed is obtained.
Figure 8:
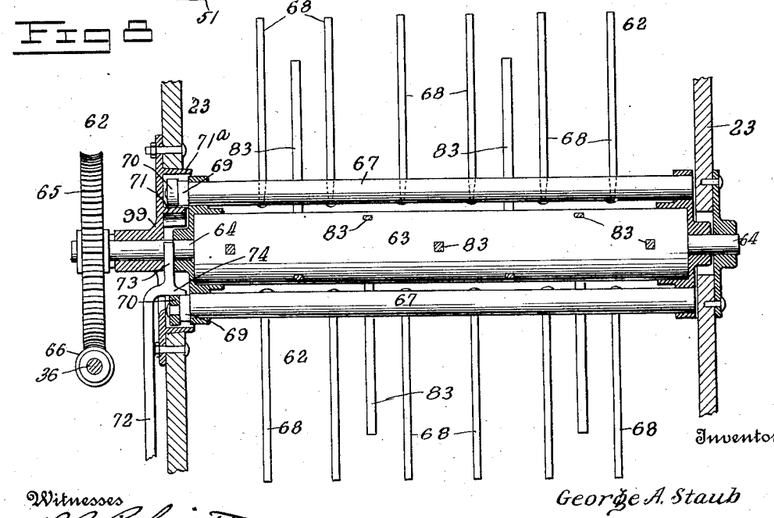
Fig. 8 is a longitudinal sectional view taken through the detector.
Figure 10:
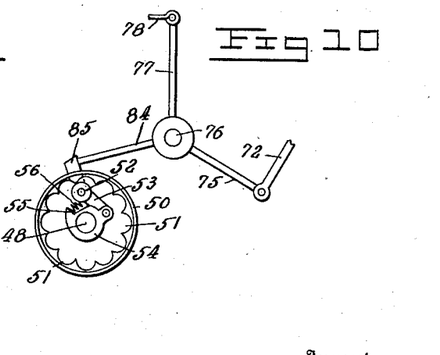
Fig. 10 is a view in elevation showing the stop mechanism in operation.
Figure 11:
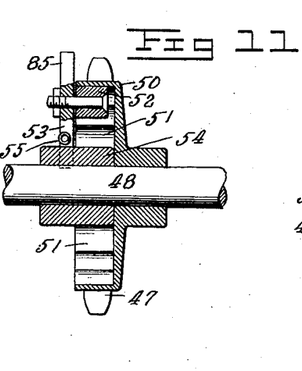
Fig. 11 is a longitudinal sectional view of the specific structure of parts of the stop mechanism.

67 designates each of a plurality of rods arranged externally of and spaced from the periphery of the cylinder 63, each of said rods being provided with a plurality of fingers 68 preferably curved in the direction of their length, as shown in Figs. 2, 7 and 9. The rods 67 are pivotally mounted and have at one end a laterally extending arm 69 at the free end of which is mounted a roller 70.

Secured to the side 23 is a bearing member 99 having an annular flange 71 which projects inwardly into the path of travel of the rollers 70, said flange being semicircular in shape and adapted to provide with a flange 71$^a$ a fixed run-way for the rollers during a portion of the rotative movement of the detector to retain the fingers 68 against a swaying movement during a period when said fingers are out of the path of movement of the grain, the flange 71$^a$ being concentric with the flange 71, and extending substantially throughout the travel path of the roller.

72 designates an arm adapted to have a rectilinear movement on the outer face of the side 23, said arm being offset and extending through an opening in the bearing member 99, and having its inner end formed bifurcated, as at 73, to embrace the shaft 64, said arm having a segment-shaped portion 74 which is adapted to also form a portion of the run-way for the rollers 70, said segment-shaped portion being of a length to provide a contact for the rollers 70 therewith during the entire period occupied by a finger 68 in passing through the path of movement of the grain from the carrier 49 to the threshing cylinder. The outer end of the arm 72 is pivotally connected to a bell crank lever 75 mounted on a stub shaft 76 carried by the side 23, said lever having one of its arms 77 connected by a rod or other suitable connection 78 to a bell crank lever 79 having one of its arms connected to an arm 80 on the support 37.

As will be understood, the fingers 68 will normally travel in a fixed position, the flanges 71 and 71$^a$ and segment 74 providing a run-way for the rollers 70, when the feed of the grain is such as to provide a constant pressure of proper extent on a finger 68 as the detector rotates, the direction of rotation being indicated by the arrow $a$ in Fig. 7. The finger will be restrained to a degree corresponding to an increased feed and this restraining will cause the rod 67 to be rocked pivotally and cause the roller 70 to apply pressure on the segment 74, with the result that the arm 72 is moved inwardly, rocking the bell crank lever 75, and through the rod 78 and lever 79 shift the support 37 so as to provide a relative change in point of contact of the members 30 and 39, thus varying the speed of the shaft 36 and through the various connections the speed of the grain carrier. To render the detector more or less sensitive in operating to change the speed, I may place on the rod 78 a spring 81 positioned between one of the brackets 35 and an abutment 82 adjustable lengthwise of the rod 78, said adjustment providing for an increase or decrease of tension on the spring 81, said spring acting also as a means tending to return the arm 72 to its normal or outer position.

As shown in Fig. 8, each rod 67 is provided with a plurality of fingers 68 spaced apart to provide detecting means extending practically throughout the width of the grain path, this plurality of fingers providing the speed changing operation just described when any one of the plurality of fingers carried by a rod is restrained by an accumulation of grain in the throat of the threshing field.

As will be readily understood, the detector structure itself being comparatively sensitive in action would be affected by variation in the speed of travel of the grain being fed, with the result that an excessive variation in the speed of the carrier might result. For the purpose of avoiding this excessive sensitiveness, should conditions require such avoidance, I provide the cylinder 63 with a plurality of radially extending arms 83, which being fixedly held in the cylinder, act to tend to carry the grain forward and thus partially eliminate the liability of undesirable finger movements.

The operation just described provides for changing the speed of the carrier within reasonable limits to take care of the ordinary accumulations or variations in the grain being fed. In order to take care of abnormal conditions, such as accumulations of grain which would actually choke the cylinder and concave or materially affect the speed of the cylinder, I provide means for positively stopping the movement of the grain carrier while such abnormal conditions exist, and this means consists in providing an arm 84 on the lever 75, and an arm 85 on the arm 53 or the member of which the arm 53 forms a part, the arm 85 projecting beyond the periphery of the wheel 50 and when the member 52 is in proper engagement traveling with said wheel 50. The arm 84 normally lies without the path of movement of the arm 85, and remains thereout, although movable with the lever 75 during the variations provided by the arm 72, until the abnormal conditions in the throat of the threshing field cause a finger or fingers 68 to move a distance sufficient to rock the lever 75 to such an extent as to throw the arm 84 into the path of travel of the arm 85, whereupon the arm 84 provides a stop in the path of movement of the arm 85 which operates to prevent further movement of the arm 85 and member 52, so that as the collar 54 continues its movement the arm 53 will be moved against the tension of the spring 56, causing the member 52 to be thrown out of engagement with its recess 51, and thereby disconnecting the operative connection between the collar 54 and wheel 50. This disconnection stops the further movement of the grain carrier, and at the same time permits of the continued rotation of the detector with the result that, as the accumulation of grain, which provides the abnormal condition, is taken care of by the threshing cylinder, the successive fingers will gradually have a less restrained movement until the arm 84 is withdrawn from the path of movement of the arm 85, whereupon the member 52 will be carried into one of the recesses 51 by the action of the spring 56 and thus again complete operative connection between the wheel 50 and collar 54. One of the particular advantages of this construction lies in the fact that during the movement of the lever 75 to the position where the arm 84 acts as a stop, the rod 78 will have been actuated to throw the member 39 to the point of greatest variation between the speed of the members 30 and 39 with the result that the movements of the parts operated by the shaft 36 will be of less speed so that the fingers of the detector will be rotated at their slowest operative speed when the carrier is stopped, thereby providing for a maximum period of time within which the accumulations may be taken up by the threshing cylinder before materially affecting the stop condition of the carrier. Obviously, the restoration of normal conditions in the throat of the threshing field acts to shift the member 39 and thereby increase the speed of rotation of the detector fingers in ratio with the increase in speed of the grain carrier.

By this construction it will be understood that the constant speed of the cylinder remains practically unchanged during operation; that the feed of the grain to the cylinder and concave can take place only after a predetermined speed of rotation of the cylinder has been reached; that the detector mechanism is operatively driven whenever the speed of rotation of the cylinder is sufficient to provide contact between the members 30 and 39, irrespective of the feed movement of the grain carrier, but that movements of the grain carrier and of the detector mechanism will be at a constant ratio whenever the grain carrier is being operated; and that a single detecting mechanism operates through a single arm to provide for variations in the speed movement of the grain carrier and also an actual stoppage of such movement without affecting the drive connection between the threshing cylinder and the detector.

Figure 1:
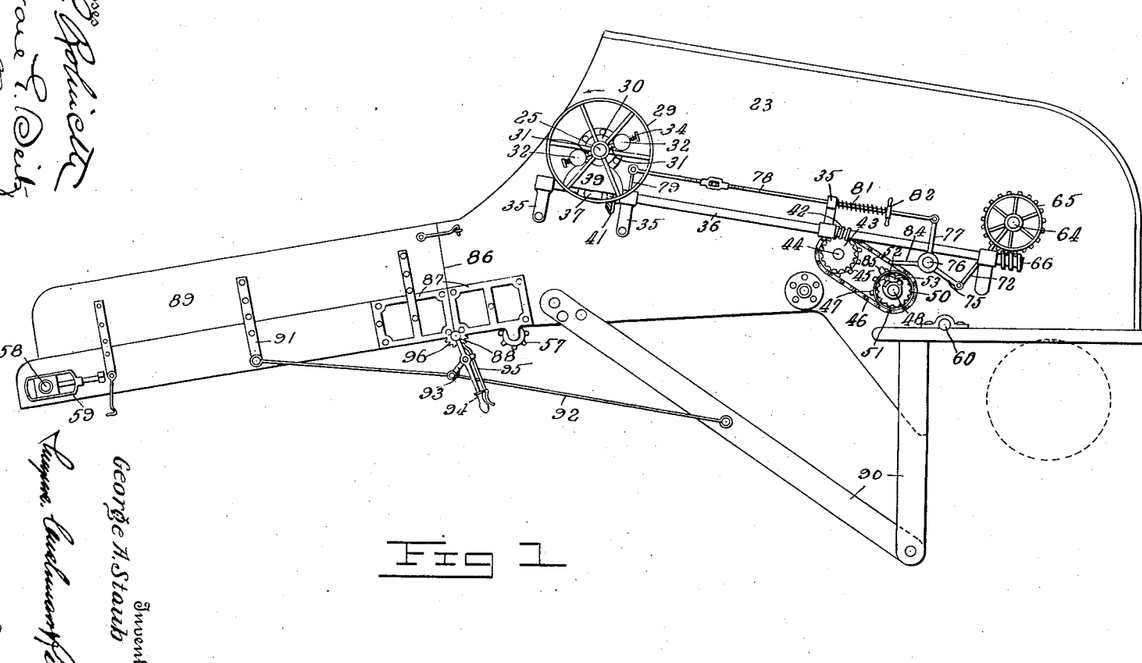
Figure 1 is a side elevation of a portion of a threshing machine, the illustration being that of the feeding end when constructed in accordance with my invention.

For convenience of storing and for other reasons, the frame of the grain carrier is made in two parts, as shown in Fig. 1, arranged to be folded. The frame is divided on the line 86, the two parts being joined by hinge members 87, connected by a pintle 88 in the form of a cross-shaft. The main portion 23 of the frame is provided with side braces 90 to which, and to a member 91 on the outer end 89 of the frame, is pivoted the outer end of a two-part strut member 92, the inner ends of said parts being pivoted together and to one end of a link 93, the opposite end of which is in turn pivoted on a handle 94 carried by the pintle or shaft 88. The handle and link together form a toggle by means of which the strut 92 is moved. A latch 95 and a toothed segment 96 regulate the position of the handle, and through the toggle, of the strut 92. The principal object of these parts is to cause the two parts of the frame to lie close together on the line 89 when the feeding mechanism is brought into operation, and also to take up wear.

While I have herein disclosed the driving mechanism for the shaft 44 as a worm and worm wheel connection, it is to be understood that this is illustrative, as, under certain conditions, such connection might be disadvantageous owing to the liability of wear being too excessive. It is to be understood that any preferred type of operative connecting mechanism may be employed at this point, one form contemplated being the use of beveled gears carried respectively by the shafts 36 and 44. As such conditions are not especially present in connection with the detector mechanism, I prefer to employ the worm and worm wheel connection shown at this point.

Having thus described the invention what I claim as new is:—

1. The combination with a threshing cylinder and concave, of a grain carrier adapted to deliver to the throat of said concave, a continuously rotatable means including independently pivoted members extending into the path of movement of the grain in juxtaposition to said throat and actuated by the grain, and means controlled by the independent movement of each of said pivoted members for varying the speed and interrupting the movement of the grain carrier.

2. The combination with a threshing cylinder and concave, of a grain carrier adapted to deliver to the throat of said concave, a rotatable detecting mechanism including independently pivoted members, the latter extending into the path of movement of the grain in juxtaposition to said throat and movable on their pivots when pressing against the grain in a direction opposite the rotary movement of the detecting mechanism, and means positively actuated by said members for controlling the speed of movement of the carrier.

3. The combination with a threshing cylinder and a concave, of a grain carrier adapted to deliver to the throat of said concave, a continuously rotatable detecting mechanism, fingers independently pivoted thereon and forming a part of the same extending into the path of movement of the grain in juxtaposition to said throat and movable by the grain in a direction opposite the rotary movement of the detecting mechanism, a speed-changing device for the grain carrier, means movable positively by the swinging of said fingers on their pivots, and a connection between said means and the speed-changing device for actuating the same.

4. The combination with a threshing cylinder and a concave, of a grain carrier adapted to deliver to the throat of said concave, a continuously rotatable detecting mechanism, fingers independently pivoted thereon and forming a part of the same extending into the path of movement of the grain in juxtaposition to said throat and adapted to be moved on their pivots in a direction opposite the rotary movement of the detecting mechanism as grain gathers in said throat, an arm extending laterally from each of said fingers, a run-way for said arms having a movable portion actuated positively by the arms when the fingers are turned on their pivots, a variable speed driving gear for the grain carrier and the detecting mechanism, and a connection between said movable section of the run-way and the speed-changing device for operating the same.

5. The combination with a threshing cylinder and a concave, of a grain carrier adapted to deliver to the throat of said concave, rotatable detecting mechanism including yieldable fingers mounted on and rotatable therewith and adapted to extend in their rotation into the path of movement of the grain, an arm extending laterally from each of said fingers, a run-way for said arms having a movable side actuated positively by the arms when the fingers are turned on their pivots, a clutch normally connecting the grain carrier with its driving mechanism, a variable speed-driving gear for the grain carrier and the controlling mechanism, and an operative connection from the movable section of the run-way to the clutch and the speed-changing device.

6. The combination with a threshing cylinder and a concave, of a grain carrier adapted to deliver to the throat of said concave, a rotatable detecting mechanism for controlling the movement of the carrier, said mechanism including a plurality of fingers carried by and spaced in circumferential succession on a rotatable member, each finger being independently yieldable in a direction opposite its rotation, a variable speed-driving fear for the grain carrier and the detecting mechanism, and means actuated by the movements of the fingers for varying the speed and controlling the movement of the carrier.

7. The combination with a threshing cylinder and a concave, of a grain carrier adapted to deliver to the throat of said concave, and a rotatable detecting mechanism for controlling the movement of the carrier, said mechanism including a plurality of fingers carried by and spaced in circumferential succession on a rotatable member, each finger being independently yieldable in a direction opposite its rotation, and means controlled positively by the independent movements of the fingers for varying the speed and movement of the carrier, said means being operated to stop the movement of the carrier under abnormal conditions in the throat of the threshing field without interrupting the rotation of the detecting mechanism.

8. The combination with a threshing cylinder and a concave, of a grain carrier adapted to deliver to the throat of said concave, and a rotatable detecting mechanism for controlling the movement of the carrier, said mechanism including a plurality of independently yieldable fingers carried by and spaced in circumferential succession on a rotatable member, and means actuated by the yielding movements of the fingers for varying the speed of movement of the carrier and the rotation of the detecting mechanism, an abnormal movement of said fingers temporarily stopping the movement of the carrier without stopping the rotation of the detecting means, the time length of stoppage being controlled by the fingers.

9. In a machine of the character described having a threshing cylinder, a grain carrier, and a threshing field, movement-controlling means comprising a speed-controlled device constant in movement, a continuously rotatable detecting mechanism including a plurality of independently swinging fingers, driving connections from said controlling device to the grain carrier and to the detecting mechanism, said fingers of the detecting mechanism being actuated by the varying conditions of the grain in the threshing throat, and means operated by said fingers for controlling said driving connections to stop, start, and change the speed of travel of the grain carrier, and vary the speed of rotation of the detecting mechanism.

10. In a controlling mechanism for grain carriers, movement-controlling means comprising a speed-controlled device constant in movement, a continuously rotating mechanism including independently swinging detecting fingers arranged to successively pass through the throat of the threshing field and be actuated by the grain therein, drive connections from said speed-controlled device to the grain carrier and to the rotating mechanism, and a member positionable by the swinging of said fingers and having positive connection with said drive connections, which connections are arranged to stop, start, and vary the speed of travel of the grain carrier and of said rotating mechanism.

11. In a controlling mechanism for grain carriers, movement-controlling means comprising a speed-controlled device constant in movement, a continuously rotating mechanism including independently swinging detecting fingers subject to the grain conditions in the throat of the threshing field and adapted to successively pass through said throat, drive connections from said speed-controlled device to the grain carrier and to the rotating mechanism, a member positionable by the swinging of said fingers when moved by the grain in the throat and having a positive connection with said drive connections, an arm movable with said member, and a normally engaged clutch device without the drive connections, said arm being movable so as to disengage the clutch device under abnormal conditions in the threshing field.

12. In a detecting mechanism for grain feed carriers, a constantly driven rotatable member having a plurality of yieldable fingers in circumferential succession, a roller positionable by each finger, and a speed-control element located in the path of travel of the rollers and adapted to be moved thereby under variations in feed conditions of the grain to be threshed.

13. In a detecting mechanism for grain feed carriers, a constantly driven rotatable member having a plurality of rods each carrying a finger, an arm projecting from each rod and having a roller, a race-way for the rollers, and a speed-changing mechanism for the detecting mechanism and the grain feed carriers, said race-way having a yieldable wall operatively connected to the speed-changing mechanism, said wall being positionable by the rollers.

14. In combination with a movable grain carrier and speed-changing members, of a constantly driven rotatable member in the path of the grain having a plurality of yieldable fingers in circumferential succession, a roller positionable by each finger, a speed-control element located in the path of travel in the rollers and adapted to be moved thereby under variations of feed conditions in the grain to be threshed, and a connection actuated by said element for operating said speed-changing members and arresting the movement of the grain carrier.

15. In a grain feed mechanism for threshing machines, a drive shaft, a driven shaft, a speed-change device between said shafts comprising two members, one of which members is longitudinally shiftable on the drive shaft into engagement with the other member by the controlling action of a governing mechanism on said drive shaft, said other member being loosely mounted for pivotal movement on said driven shaft and having a constant gear connection to said driven shaft, a grain carrier and a continuously rotatable detecting mechanism driven by the driven shaft, connections between the detecting mechanism and the driven shaft member of the speed-change device for swinging said member above the driven shaft to vary the speed of said shaft, and a normally engaged clutch mechanism between the driven shaft and the driving shaft of the grain carrier adapted to be disengaged by the detecting mechanism under abnormal conditions of the grain to stop the movement of the grain carrier.

In testimony whereof I have hereunto set my hand in presence of two subscribing witnesses.

GEORGE A. STAUB.

Witnesses:
ARTHUR L. BRYANT,
HORACE G. SEITZ.

---

Copies of this patent may be obtained for five cents each, by addressing the "Commissioner of Patents, Washington, D. C."